US006572357B2

(12) United States Patent
Bailey

(10) Patent No.: US 6,572,357 B2
(45) Date of Patent: Jun. 3, 2003

(54) APPARATUS FOR MANUFACTURING MONOLITHIC CROSS FLOW PARTICULATE TRAPS

(75) Inventor: John M. Bailey, Dunlap, IL (US)

(73) Assignee: Illinois Valley Holding Comany, Dunlap, IL (US)

( * ) Notice: Subject to any disclaimer, the term of this patent is extended or adjusted under 35 U.S.C. 154(b) by 94 days.

(21) Appl. No.: 09/794,287

(22) Filed: Feb. 27, 2001

(65) Prior Publication Data

US 2002/0116818 A1 Aug. 29, 2002

(51) Int. Cl.[7] ................................................ B28B 3/26
(52) U.S. Cl. .................. 425/381; 264/177.12; 425/465; 425/466
(58) Field of Search ................... 425/308, 315, 425/381, 465, 466; 264/177.12

(56) References Cited

U.S. PATENT DOCUMENTS

| 2,778,493 A | * | 1/1957 | Kreidler ..................... 425/381 |
| 3,002,615 A | * | 10/1961 | Lemelson ................... 425/381 |
| 3,144,682 A | * | 8/1964 | Thielfoldt .................. 425/381 |
| 3,352,003 A | | 11/1967 | Murtha |
| 3,422,648 A | * | 1/1969 | Lemelson ................... 425/465 |
| 3,708,253 A | | 1/1973 | Lemelson ................... 425/393 |
| 3,932,090 A | * | 1/1976 | Brumlik ..................... 425/381 |
| 4,159,564 A | | 7/1979 | Cooper, Jr. |
| 4,178,145 A | | 12/1979 | Hamamoto et al. ......... 425/380 |
| 4,298,328 A | | 11/1981 | Frost ........................... 425/381 |
| 4,384,841 A | | 5/1983 | Yamamoto et al. ......... 425/461 |
| 4,415,344 A | | 11/1983 | Frost et al. |
| 4,468,366 A | * | 8/1984 | Socha, Jr. ................. 264/177.12 |
| 4,550,005 A | | 10/1985 | Kato ........................... 425/380 |
| 4,801,419 A | | 1/1989 | Ward et al. .................. 425/393 |
| 4,833,883 A | | 5/1989 | Oda et al. |
| 4,840,028 A | | 6/1989 | Kusuda et al. |
| 4,979,889 A | | 12/1990 | Frost ....................... 425/192 R |
| 4,987,738 A | | 1/1991 | Lopez-Crevillen et al. |
| 5,024,054 A | | 6/1991 | Barris et al. |
| 5,063,737 A | | 11/1991 | Lopez-Crevillen et al. |
| 5,065,574 A | | 11/1991 | Bailey |
| 5,171,337 A | | 12/1992 | Pollock |
| 5,212,948 A | | 5/1993 | Gillingham et al. |
| 5,293,742 A | | 3/1994 | Gillingham et al. |
| 5,566,545 A | | 10/1996 | Hijikata et al. |
| 5,809,777 A | | 9/1998 | Kawamura |
| 5,930,994 A | | 8/1999 | Shimato et al. |
| 5,930,995 A | | 8/1999 | Watanabe et al. |
| 5,941,066 A | | 8/1999 | Araki et al. |
| 5,956,944 A | | 9/1999 | Dementhon et al. |
| 5,966,928 A | | 10/1999 | Igarashi |
| 6,206,675 B1 | | 3/2001 | BeVier ....................... 425/190 |
| 6,315,545 B1 | | 11/2001 | Inoue ....................... 425/192 R |

* cited by examiner

Primary Examiner—James P. Mackey
Assistant Examiner—Joseph Leyson
(74) Attorney, Agent, or Firm—Husch & Eppenberger, LLC; Richard J. Musgrave; Robert E. Muir

(57) ABSTRACT

An apparatus permits production of the complete monolithic cross flow trap module in a single extrusion process followed by firing to sinter the plasticized ceramic material and remove the plastics to achieve open porosity. Consequently, the trap modules can be made in large production quantities at minimal cost.

5 Claims, 11 Drawing Sheets

Ref: Fig. 1

Ref: Fig. 3 region "A"

Ref: Fig. 3 region "B"

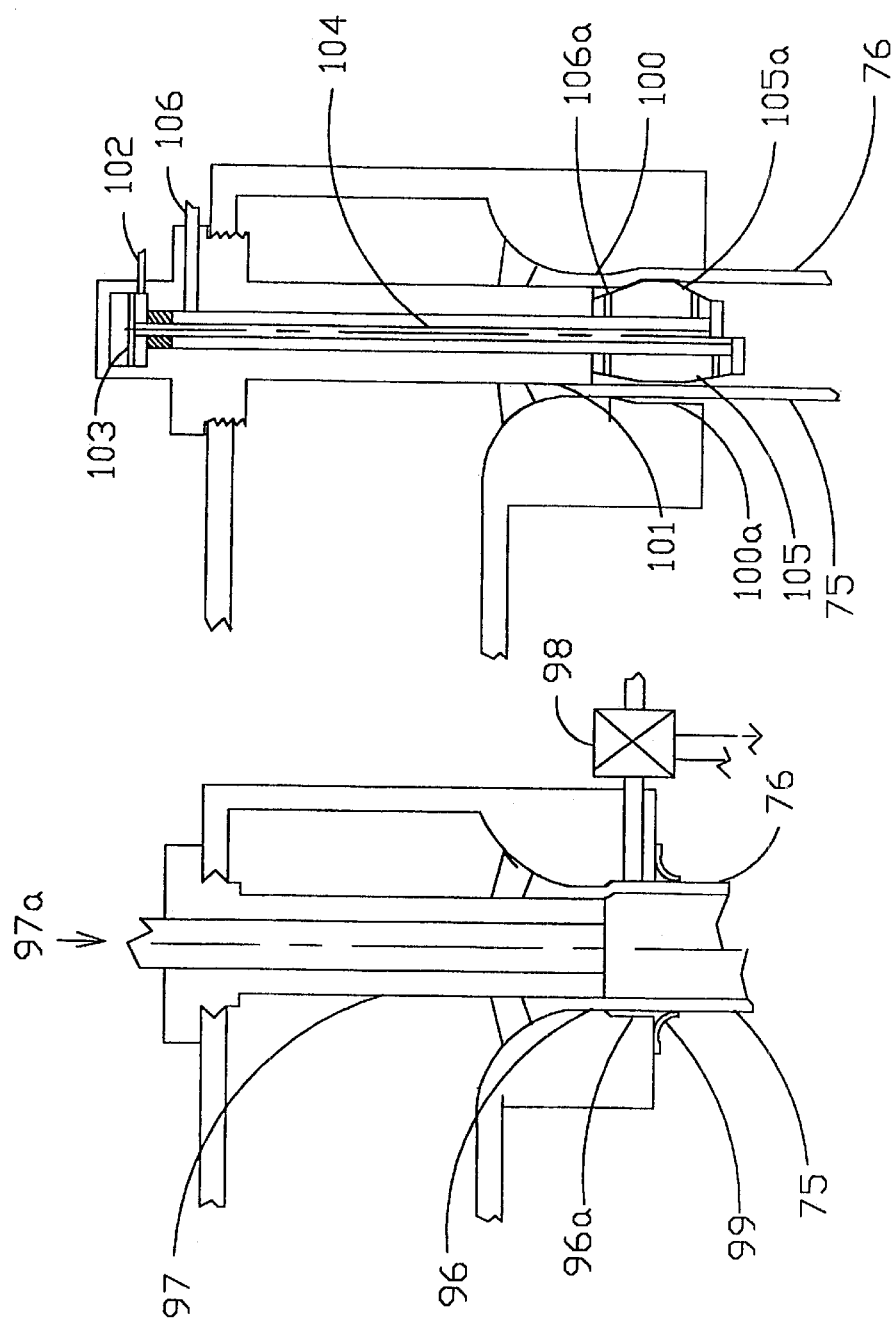

APPARATUS FOR MANUFACTURING MONOLITHIC CROSS FLOW PARTICULATE TRAPS

BACKGROUND OF THE INVENTION

The present invention relates generally to reducing emissions from the exhaust of diesel engines and, more particularly, to the method, design and manufacture of monolithic cross flow traps for removing particulates from the exhaust of diesel and other internal combustion engines. This type of particulate trap is used in my co-pending application Ser. No. 09/516,480, filed Mar. 1, 2000, entitled "Apparatus and Method for Filtering Particulate In An Exhaust Trap now U.S. Pat. No. 6,233,926."

Diesel engine exhaust smoke is largely comprised of small soot particles or particulate that is a nuisance and which the Environmental Protection Agency has identified as a health hazard when inhaled into the lungs and this has resulted in federal regulations limiting the amount of particulate that an engine may emit into the atmosphere. Consequently, an intensive effort has been underway during the last twenty years to reduce the amount of particulate emitted into the atmosphere from diesel engine exhaust stacks. The preferred approach, and the one on which most effort has been expended, is to reduce the particulate generated by engines. Another approach has been to filter out or trap the particulate matter contained in the flow of exhaust gas prior to its release into the atmosphere. Because emission regulations have become ever more stringent, efforts have been made toward the development of practical and reliable particulate trap systems.

Particulate trap systems have generally consisted of two types: depth filters of metal wire coils or other material usually having a catalyst on the surfaces to promote ignition of the particulate and surface filters of ceramic or other heat resistant material. The catalyzed depth filters filter out or trap the particulate and promote its combustion. These are considered to be more expensive and, in addition, the catalyst can result in the generation of undesirable compounds in the exhaust emitted.

Most of the effort has been directed toward wall-flow trap systems that use porous ceramic that contain many passages, somewhat like a honeycomb as explained in Frost et al., U.S. Pat. No. 4,415,344 and shown in FIG. 1. The honeycomb section can be extruded; hence, relatively inexpensive to manufacture and provides a large passage surface area for a given size trap. By plugging the exit ends of alternate passages, and the entrance ends of the remaining passages, the exhaust gas is forced through the porous walls, of the in-flow passages into the out-flow passages as indicated by the arrows. The soot particles are removed from the dirty in-flow gas and collect in a layer which builds up on the inner walls of the passages; clean gas exits from the out-flow passages. While these traps remove 95–98% of the particulate from the exhaust gas stream, pressure drop across the trap increases due to the accumulation of the soot and ash. While the soot can be burned periodically by heating all or a portion of the exhaust gas, this entails considerable loss of energy and, more seriously, the heat of combustion of the soot leads to cracking and melting of the traps.

Complicated catalyst means have been used to lower the ignition temperature of the soot to protect the trap with mixed results but burnout does not prevent long term accumulation and pressure drop due to the build up of incombustible ash.

One system uses high pressure reverse flow of cool air to mechanically remove the soot and ash, and burn the soot outside the trap; however, the use of high pressure air requires a rather heavy structure trap system to provide adequate strength to prevent problems with the trap seals and valves used to control the reverse flow. In addition, the energy required to provide the high pressure air adversely affects engine efficiency.

As mentioned in my co-pending application Ser. No. 09/516,480, filed Mar. 1, 2000, entitled "Apparatus and Method for Filtering Particulate in an Exhaust Trap," there are cross flow traps, of the type shown in FIG. 2, that are made of porous ceramic tubes that pass through the trap module. End walls support the ceramic tubes and seal the spaces between them near their ends. As indicated by the arrows, a portion of the exhaust gas that enters the trap module at the left passes through the porous walls and the soot and ash is filtered out. The remaining or unfiltered exhaust gas is passed through the trap and exits at the right. The exhaust gas that passes through the porous walls passes through the small clearances between the tubes and exits through the space between the two end walls. The end walls of the trap module prevent unfiltered exhaust gas from entering the clearances.

Like the honeycomb wall-flow type of trap, the cross flow trap will remove 95 to 98% of the soot from the exhaust gas as the exhaust gas passes through the porous walls of the tubes. Also, in common with the better known honeycomb wall-flow trap, the filtering action leaves a layer of soot and ash on the inner surface of the tubular passages that will increase the pressure drop and engine back pressure; hence, adversely affecting engine performance. For this reason the layer of soot and ash must be periodically removed.

The inventions covered by my co-pending application use control techniques that cause all or a significant portion of the exhaust gas to periodically flow through and exit from the tubular passages at a velocity that is sufficient to dislodge and/or erode any significant accumulations of soot and ash. In all the embodiments, the dislodged particles are blown out of the passages to be burned and/or stored for periodic removal. By using these techniques, excellent filtration efficiency can be achieved and the soot and ash can be removed, burned and/or stored. Moreover, this can be accomplished without igniting the soot in the trap; hence, there are no adverse consequences, such as loss of trap life by cracking or melting.

The preferred embodiment of the cross flow multi-tubular trap module is to make the tubes and end walls as a monolith of a ceramic material such as porous cordierite. By maintaining a small but carefully controlled clearance between the individual tubes, the total internal surface area of the tubes per unit of trap module volume is about the same as the conventional honeycomb wall-flow trap. Thus, the total trap size and backpressure for a given engine are about the same and, by using the manufacturing techniques taught by this invention, can be made at equal or lower cost.

A tubular cross flow porous ceramic trap that has oval shaped passages is made by stacking formed sheets of cordierite has been developed by Asahi Glass Company and is the subject of Oda et al., U.S. Pat. No. 4,833,883. While this trap could be used as the particulate filter in the particulate trap system that is covered by my co-pending application, it is considered larger in size and more expensive to manufacture than the module configuration of this invention.

SUMMARY OF THE INVENTION

An objective of the invention is to provide monolithic cross flow trap designs that will provide high filtering efficiency and acceptable pressure loss in traps of minimal size and cost.

Another objective is to provide methods for manufacturing monolithic cross flow trap modules by extruding plasticized cordierite ceramic or other refractory materials in a single extrusion step followed by firing and minor finishing.

Yet another objective is to provide methods for economically manufacturing large size monolithic cross flow trap modules that are not easily manufactured by single step extrusion of the total trap module.

Still another objective is to provide methods for manufacturing monolithic cross flow trap modules of different sizes and configurations with minor changes in the manufacturing equipment.

In accordance with one aspect of the invention, there is provided a device for extruding plasticized cordierite ceramic forming material through a variable die section to form the trap. The die section can be arranged to form either a number of tubular passages having their outside surfaces in close proximity to each other or, by changing the configuration of the die set, to form passages in a simple honeycomb configuration. The multiple tubular passages have porous walls, that extend for nearly the full length of the trap module and comprise the filter section. The short honeycomb lengths at each end of the trap are made by thickening the tubular passage walls and provide the sealed end walls for separating the filtered exhaust from the unfiltered exhaust that enters the trap. Firing of the extruded trap produces a monolithic cross flow trap of porous ceramic that requires only minor finishing.

In accordance with another aspect of the invention, the manufacture of a monolithic cross flow trap begins with the conventional manufacture of tubes having walls of porous cordierite or similar material. The tubes are then woven into a mat using wire or mono-filament plastic as the binding means. Finally, the mat is rolled about a small mandrel while cords of pliable plasticized cordierite are fed between the turns near the ends of the tubes. The diameter of the wires or mono-filament provides a small closely controlled clearance between each tube while the plasticized cordierite cords squeezed around the outside diameters of the tubes form the two end walls of the trap module. The wound trap module is then fired and finish machined.

In yet another aspect of the invention, the porous cordierite tubes are formed with slightly enlarged outside diameters near their ends. When a number of the tubes are collected in a bundle, the enlarged diameters provide a closely controlled clearance between the outside diameters of the porous tubes throughout most of their lengths. The tubes, that have closed ends, are assembled into snug bundles and then end walls of pliable cordierite forming material are pressed over each end of the tubes. The monolithic trap module results from firing the module and machining of the end faces to remove the tube end closures and finish machine the trap faces.

These and other objects and advantages of the present invention will become apparent as the same becomes better understood from the following detailed description when taken in conjunction with the accompanying drawings.

BRIEF DESCRIPTION OF THE DRAWINGS

Reference is now made to the drawings which illustrate the best known modes for practicing the methods of manufacturing and the apparatus and wherein similar reference characters indicate the same parts throughout the several views.

FIG. 11a is an enlarged view of a die used in one method of extruding the tubes with enlarged diameters near their ends and means for pinching the tubes in the enlarged length to cut the tube material to a length while squeezing the ends closed.

FIG. 11b is an enlarged view of a die used in an alternative method of extruding the tubes with enlarged diameters near their ends.

DETAILED DESCRIPTION

My co-pending application Ser. No. 09/516,480, filed on Mar. 1, 2000, entitled "Apparatus and Method For Filtering Particulate In An Exhaust Trap" is hereby incorporated by reference.

Figure 1:
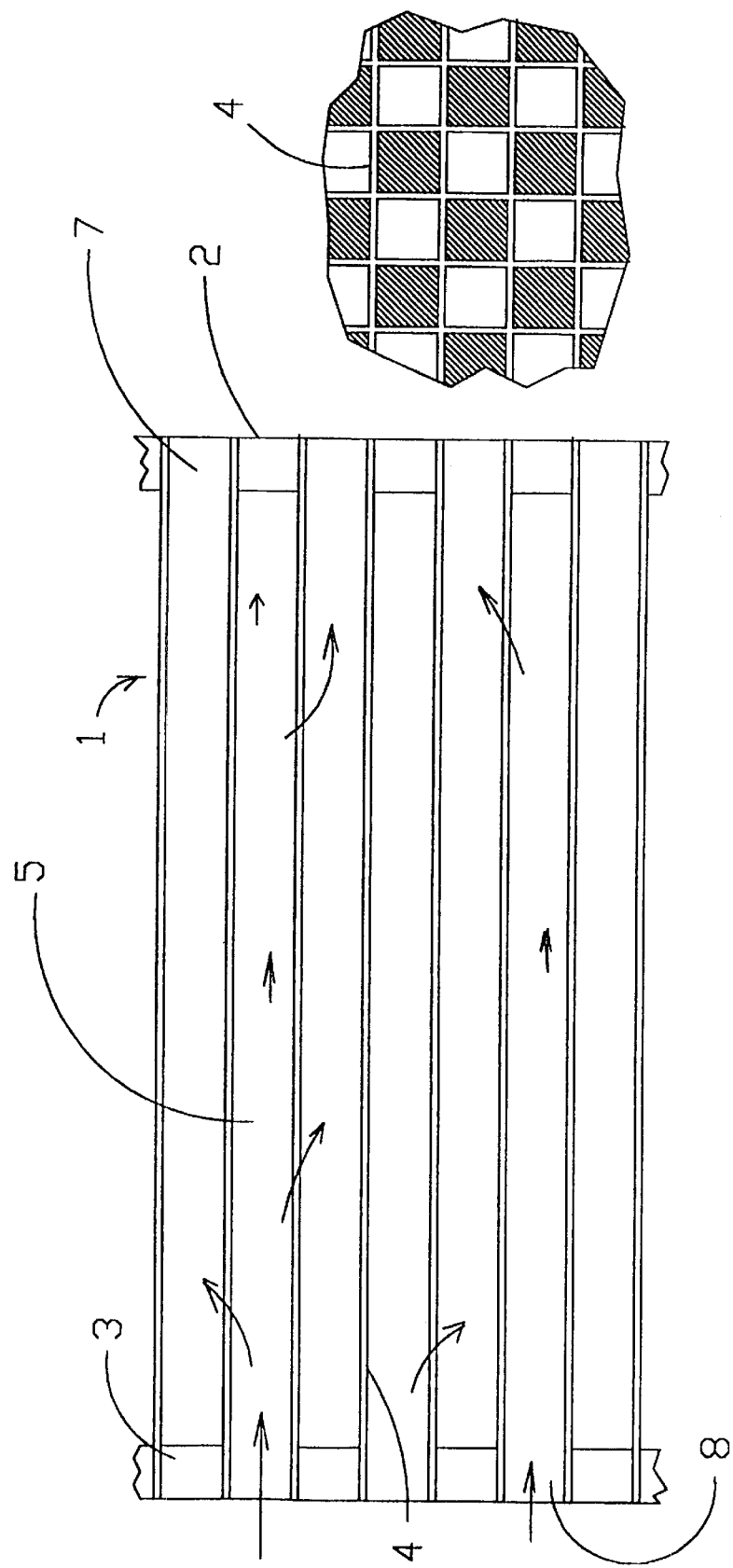
FIG. 1 is a section view of a typical monolithic honeycomb wall-flow trap.

FIG. 1 is a section view of a typical monolithic honeycomb wall-flow trap 1 having passages 5 that is popular in particulate trap systems. Alternate passages 5 have plugged exit ends 2, and the remaining passages 5 have plugged entrance ends 3; hence, the exhaust gas enters passages 5 that have plugged exit ends 2 and is forced through porous walls 4, of in-flow passages 5 into the out-flow passages 5 having plugged entrance ends 3 and unplugged exit ends 7. The soot particles are removed from the dirty in-flow gas and collect in a layer which builds up on the inner walls of the passages 5; filtered exhaust gas exits from the out-flow passages 5. In the monolithic honeycomb wall-flow trap 1, the exhaust gas enters unplugged ends 8 of the passages 5 and, due to the passages 5 having plugged exit ends 2 the pressure builds up within the passages 5 and the exhaust gas is forced through the porous walls 4 where the particulate in the exhaust gas is filtered out. The exhaust gas passing through the porous walls 4 is filtered exhaust gas and this filtered exhaust gas is then passed out of the passages 5 having the unplugged exit ends 7.

Figure 2:
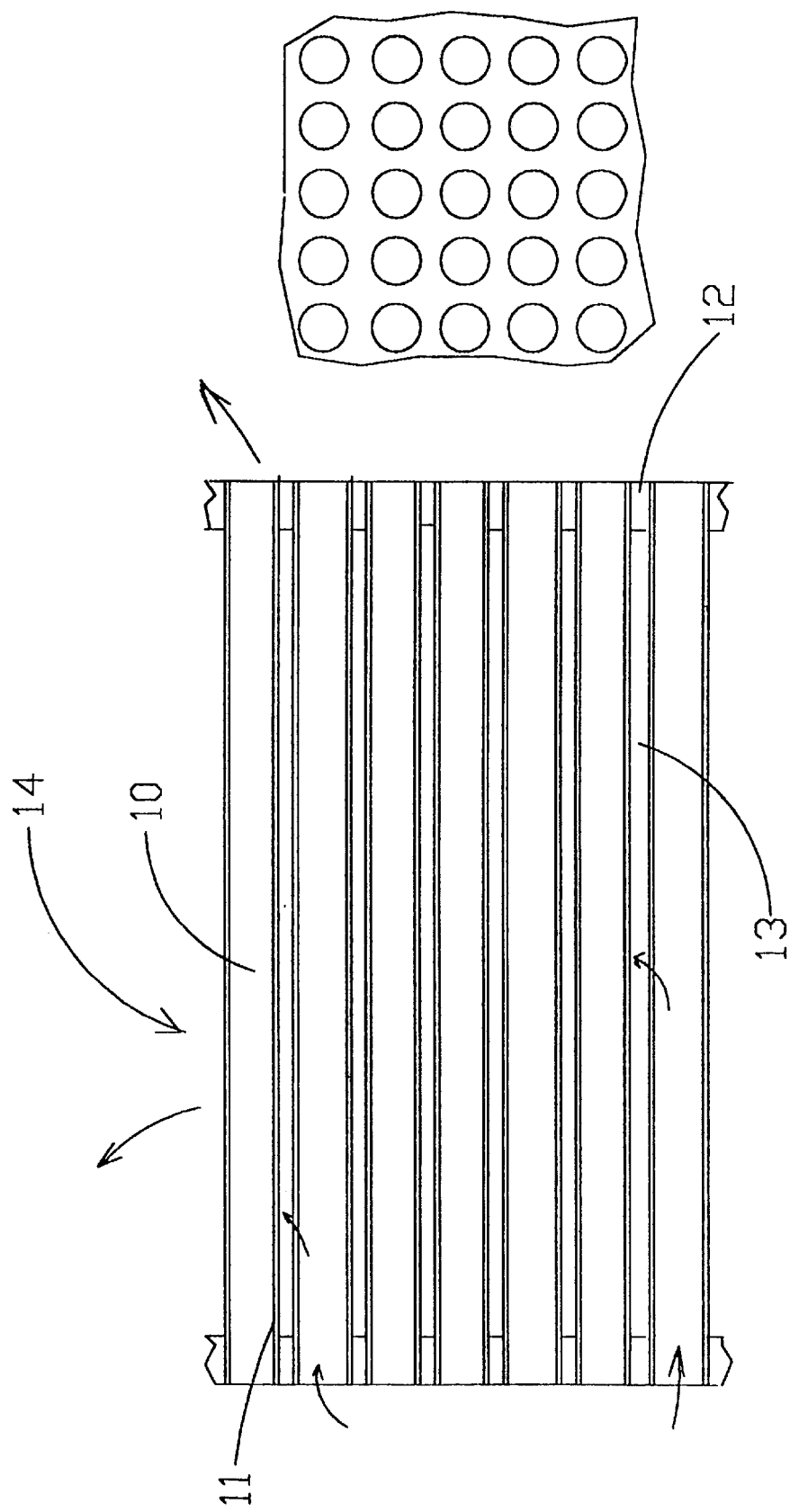
FIG. 2 is a section view of a cross flow particulate trap that incorporates tubular refractory passages that have porous walls.

FIG. 2 is a section view of a cross flow particulate trap 14 that incorporates tubular refractory passages 10 that have porous walls 11. Between the tubular refractory passages, a clearance gap 13 exists. Due to the pressure in the tubular refractory passages 10 caused by the incoming exhaust gas, portions of the exhaust gas is forced through the porous walls 11 into the clearance gaps 13 whereby the particulate is filtered out of the exhaust gas. The exhaust gas that is filtered through the porous walls 11 into clearance gaps 13 is ultimately released into the atmosphere. The clearance gaps 13 are sealed with end walls 12 to prevent unfiltered exhaust gas from entering the clearance gaps 13. The end walls 12 also provide equal spacing between the passages 10. The clearance gaps 13 ultimately connect indirectly to an exhaust stack that directs and releases filtered exhaust gas into the atmosphere. This type of particulate trap 14 is preferably monolithic and is the type required for the particulate trap system covered by my aforementioned co-pending application. This type of trap has been discussed in detail in my co-pending application incorporated by reference herein.

Figure 3:
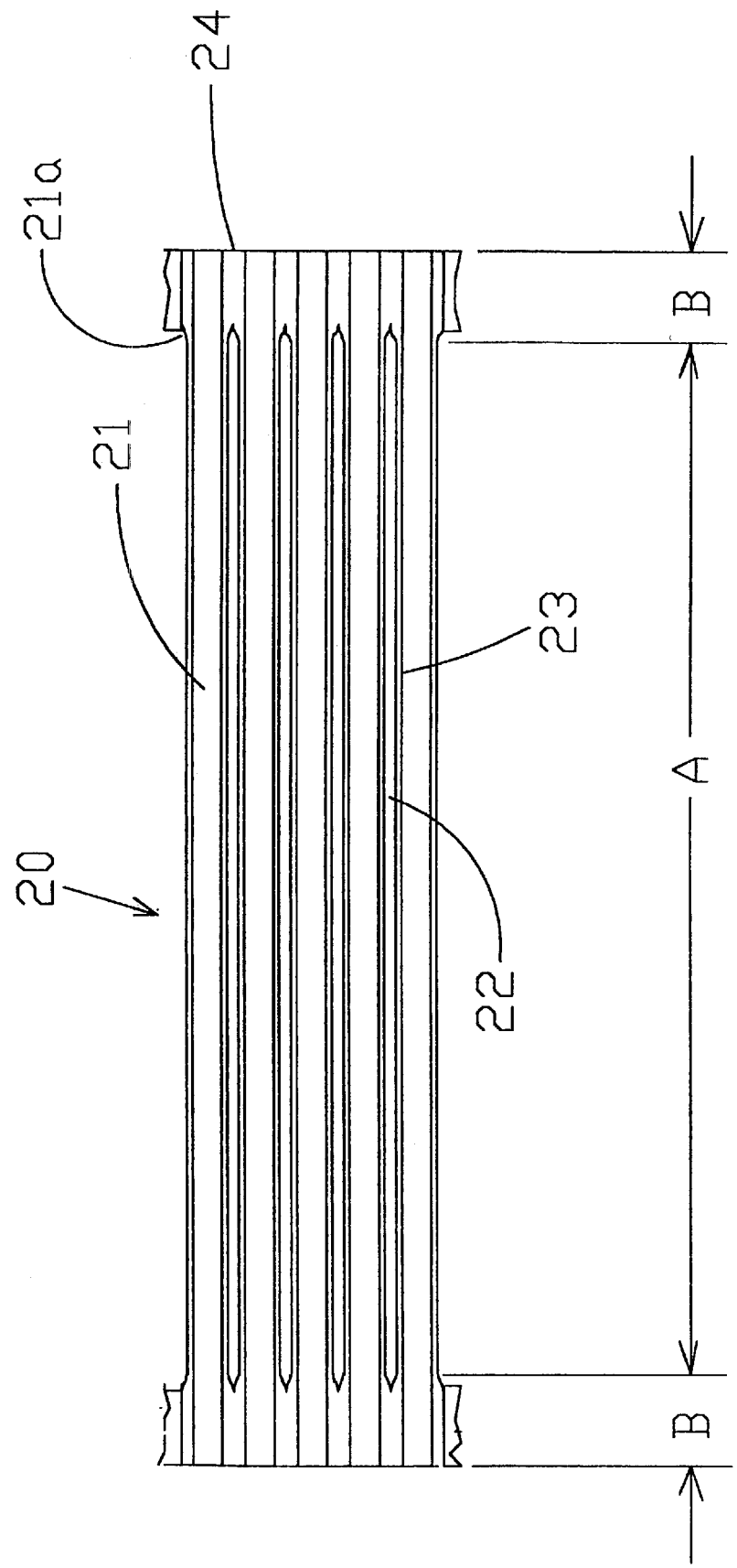
FIG. 3 is a section view of an alternative cross flow trap module constructed by extrusion of plasticized ceramic, such as cordierite, manufactured by a single extrusion process.

FIG. 3 illustrates one embodiment of the invention which is shown in a cross section view. The invention is a monolithic particulate trap 20 that is manufactured in a single extrusion process. The trap 20 is preferably constructed of porous cordierite ceramic. However, other similar materials can be used to yield thin walls having interconnected open porosity following a firing or sintering process. As shown, longitudinal through tubular passages 21, are square in cross section and have approximately the same cross section and wall thickness dimensions as the conventional honeycomb wall-flow traps previously discussed. Throughout most of their length, the tubular passages 21 are separated on all sides from the adjacent tubular passages 21 by small clearances 22 (approx. 0.020 inch) between the porous passage walls 23. Near the trap ends 21a of the tubular passages 21, walls 23 increase in thickness until they blend together with the walls of the adjacent tubular passages 21, as shown at end walls 24. The short lengths or transitions 21a where the walls 23 of the tubular passages 21 blend together form the end walls 24 for the trap 20 to provide structural integrity for the trap module and for sealing the space between the tubular passages 21 at their ends. The end walls 24 effectively seal off the volume of the clearance gaps 22 that surround the tubular passages 21. Thus, the trap 20 can be sealed at the periphery of the end wall regions so the unfiltered exhaust gas at the entrance or exit of the trap modules cannot enter the region around the length of the trap 20 where the filtered exhaust gas emanates from porous walls 23. Due to the pressure in the tubular passages 21 caused by the incoming exhaust gas, portions of the exhaust gas is forced through the porous walls 23 into the clearance gaps 22 whereby the particulate is filtered out of the exhaust gas. The exhaust gas that is filtered through the porous walls 25 into clearance gaps 22 is ultimately released into the atmosphere. The clearance gaps 22 are sealed with end walls 24 to prevent unfiltered exhaust gas from entering the clearance gaps 22. The end walls 24 also provide equal spacing between the tubular passages 21. The clearance gaps 22 ultimately connect indirectly to an exhaust stack that directs and releases filtered exhaust gas into the atmosphere.

Method for Extruding the Trap Modules

Figures 4A, 4B, 4C:
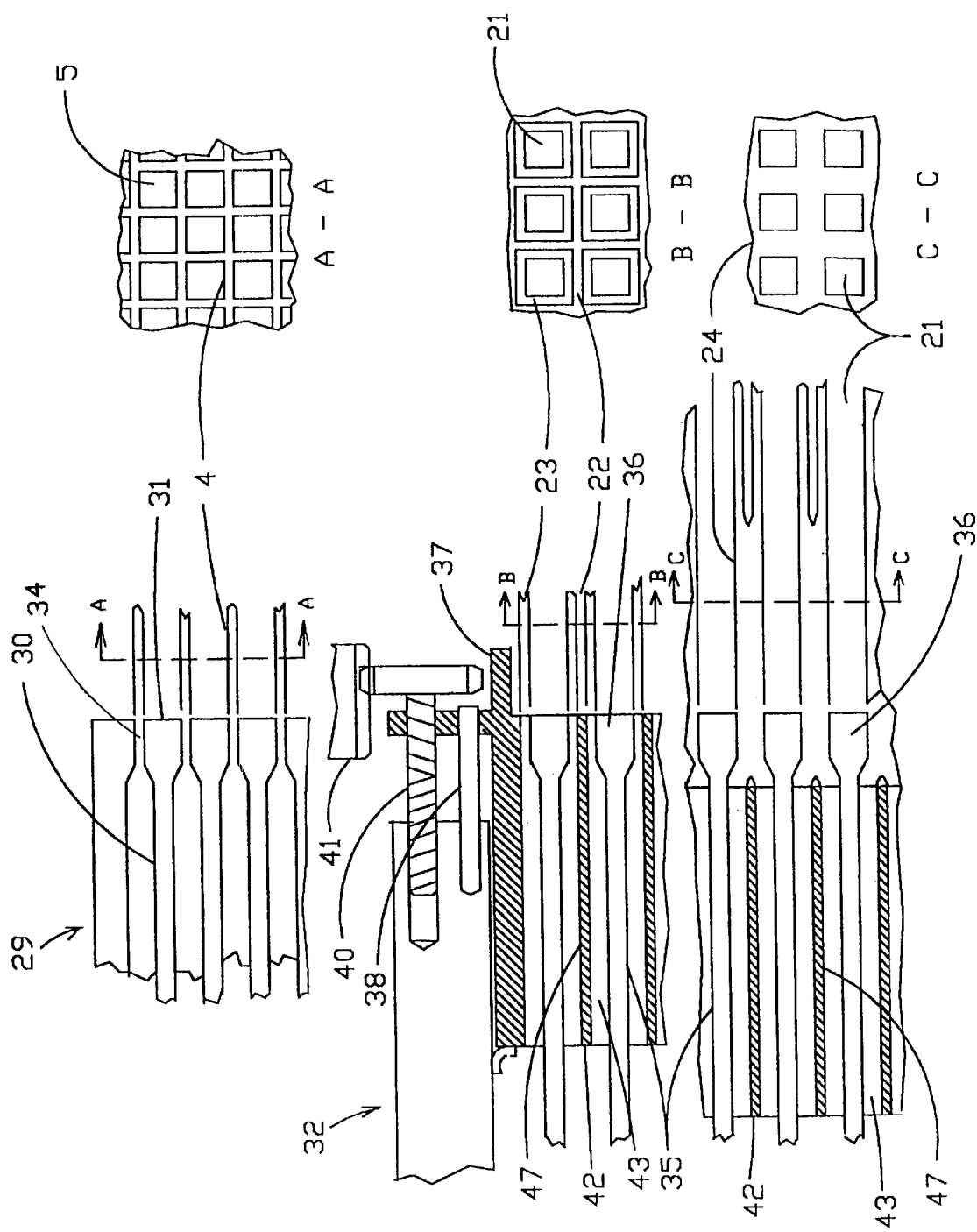
FIG. 4a is a section view of a die that is used with an extrusion machine to manufacture wall-flow trap modules of the prior art wallflow honeycomb type.
FIG. 4b is a section view of a die with an axially movable honeycomb die member used to manufacture a trap module as shown in FIG. 3 with its movable part positioned to manufacture spaced-apart parallel tubular passages.
FIG. 4c is a section view of a die with an axially movable honeycomb die member used to manufacture the trap module shown in FIG. 3 shown with its movable part positioned for enlarging the passage wall thickness to produce an end wall without altering the internal dimensions of the passage in the end regions.

The device and method for extruding traps of prior art honeycomb type is shown for reference in FIG. 4a. FIGS. 4b and 4c represent first and second positions, respectively, of one embodiment of the invention, which is the device and method for manufacturing the trap 20 shown in FIG. 3. FIG. 4b illustrates how the middle region or area "A" of the trap 20 shown in FIG. 3 is extruded, and FIG. 4c illustrates how the wall transitions 21a and end walls 24, identified as region "B" in FIG. 3, are extruded. A material, such as porous cordierite ceramic, is extruded by first preparing a mixture of fine cordierite ceramic powder and mixing it with powdered plastic materials. Part of the plastic powder provides the desired open porosity following burn-out during the firing or sintering process. Another part of the plastic is melted or softened by heat provided during the extrusion process and this provides the material mixture with the ability to flow through small die openings as a result of the high pressure impressed during the extrusion process. The materials and techniques for extruding shapes having refractory thin walls and interconnected open porosity are known to those skilled in the art and these are used in connection with the extrusion invention incorporated in one embodiment of this invention. For simplicity, the various extruded forms referenced herein are collectively expressed as plasticized ceramic or plasticized cordierite even though various other material combinations are also used to yield refractory thin walls having interconnected open porosity following firing or sintering.

FIG. 4a is a section view of a die 29 that is used with extrusion machines to manufacture the wall-flow trap modules of the honeycomb type as shown in FIG. 1. The die 29 is similar to those shown in Frost, U.S. Pat. No. 4,298,328 and used to form honeycomb sections of porous cordierite ceramic. The pliant plasticized mixture is forced through clearances 34 between enlarged heads 31, of projecting die members 30, and then emanates as honeycomb walls 4. The size of the enlarged head 31 of the projecting die members 30 determines the inside dimensions of passages 5. It is assumed that the honeycomb cordierite structure results after the honeycomb section is extruded, cooled, cut to length and then sintered or fired. As discussed earlier and as illustrated in FIG. 1, in the conventional wall-flow traps, the adjacent passages are plugged on alternate ends in a second manufacturing step.

FIG. 4b illustrates one embodiment of the invention positioned to produce parallel spaced-apart tubes. Projecting fixed die members 35 are similar to those of the aforementioned reference Frost, U.S. Pat. No. 4,298,328 but contains, inter alia, projecting die members 35 that are longer. Although the dimensions of the projecting die members 35 with the enlarged heads 36 are only slightly larger than those of Frost, U.S. Pat. No. 4,298,328, the space between them is increased. Further, an axially movable honeycomb die member 37 constructed of high strength material has been added. To simplify and improve clarity, cross section lines have been added to the movable honeycomb die member 37 and its honeycomb walls 47. The movable honeycomb die member 37, is approximately an inch in axial length and, assuming a four inch trap diameter, the diameter would be the same. Dowels 38, are used to accurately locate the movable honeycomb die member 37, relative to the enlarged heads 36, of the projecting die member 35. The moveable honeycomb die member 37 can be moved axially a small amount on demand by screw/gear 40 or other suitable means for moving, actuated by internal ring gear 41. While there are numerous ways that the moveable honeycomb die member 37 can be moved axially, the multiple simultaneously actuated screw/gear 40 arrangement will keep the movable honeycomb die member 37 accurately positioned perpendicular to the movable honeycomb die member 37 centerline, while occupying a minimal amount of space. Further, this can be accomplished with a simple modification to an existing extrusion machine.

FIG. 4c is a section view of the movable honeycomb die member 37 used to manufacture the trap module shown in FIG. 3 with its honeycomb walls 47 positioned to enlarge the passage wall 23 thickness such as to blend together at transition 21a and create end walls 24 for all of the passages. The end walls 24 seal the clearance gaps 22. Referring to FIG. 3, the clearance gaps 22 are sealed by the walls 23 of the tubular passages 21 blending together at transition 21a and forming end walls 24. The difference between FIG. 4b and 4c is that FIG. 4c illustrates the movable honeycomb die member 37 and honeycomb walls 47 moved to the left by a small amount to a second position at which the honeycomb passages no longer encompass the enlarged heads 36, of the projecting die members 35, and the flow of plasticized material, such as cordierite, around enlarged heads 36 produces a simple, thick-walled honeycomb section.

Extrusion of the Cross Flow Multi-tubular Traps

In FIG. 4b, the movable honeycomb die member 37 and honeycomb walls 47 have been moved to the right to a first position such that the right edge of the honeycomb walls 47 is aligned evenly with the ends of the enlarged heads 36 of the projecting die member 35. Plasticized material is pressurized by the extrusion equipment and flows from left to the right in the drawing. When the flow reaches leading edges 42, of the honeycomb walls 47 of the movable honeycomb die member 37, it will move into region 43, between the honeycomb walls 47 and the shanks of the projecting die members 35. As the flowing material reaches the enlarged heads 36, of the projecting die members 35, the material will be forced between the enlarged heads 36 and honeycomb walls 47. This action will define the walls 23 of the passages 21. As indicated, the thickness of the honeycomb walls 47 at approximately 0.020 inch will determine space or clearance gaps 22, between the walls 23, of each passage 21. This operation will continue until most of the length of the trap has been extruded. Referring to FIG. 3, this extrusion is represented as area "A".

When the trap has been extruded to a point, determined by sensing the position of the extruded material that it is desirable to provide end walls, the movable honeycomb die member 37 and honeycomb walls 47, is moved to the left or a second position illustrated in FIG. 4c. The plasticized trap material will continue to move along the regions 43 between the shank of the projecting die members 35, and the honeycomb walls 47. When it nears the enlarged heads 36, of the projecting die members 35, the movable honeycomb die member 37 no longer plays a part in restricting the flow leaving the die 32. This restriction is now the area between the enlarged heads 36, of the projecting die members 35. Thus, the material flows in together and it is then extruded as an end wall 24. The total thickness of the flowing material in the regions 43, around each projecting die member 35 is greater than the clearance between the enlarged heads 36, of the projecting die members 35. This assures that there will be significant pressure required to force the material between the enlarged heads 36, assuring adequate pressure and mixing to prevent voids from forming in the resulting end walls 24.

It is desirable to control the rate of axial movement of the movable honeycomb die member 37, between its first and second position, and second and first position, as a function of the rate of extrusion of the material as it flows from the die 32. This will assure smooth transition between the regions of parallel tubes 23 and the regions of simple honeycomb passages 21 with thick walls that constitute the end walls 24.

As the extruded material with its slightly separated tubular members and periodic lengths where the walls are thickened and joined leaves the extrusion die 32, it is desirable to move it along in a water trough to cool and harden the plasticized material. It will be obvious that the water will be able to flow in and around the individual tubes to provide quick cooling. A traveling saw will move along at the same velocity as the emerging material and move in as directed by sensors to cut the extruded material apart in the approximate center of the passage end wall regions to produce individual trap modules. These types of operations (traveling saw, etc.) are known to the extrusion art and no further elaboration is considered necessary.

While it is shown that a movable die 37 is used to seal and support the tubes at their ends, it is apparent that the arrangement could be used to make one or more wall sections along the length of the trap to provide support and vibration damping of the tubes.

The tubular passages are shown that have a preferred square shape which is used with the more common wall-flow trap. However, the die 29 could be arranged to make tubes of circular or other configuration while using the same method described herein.

Figure 5:
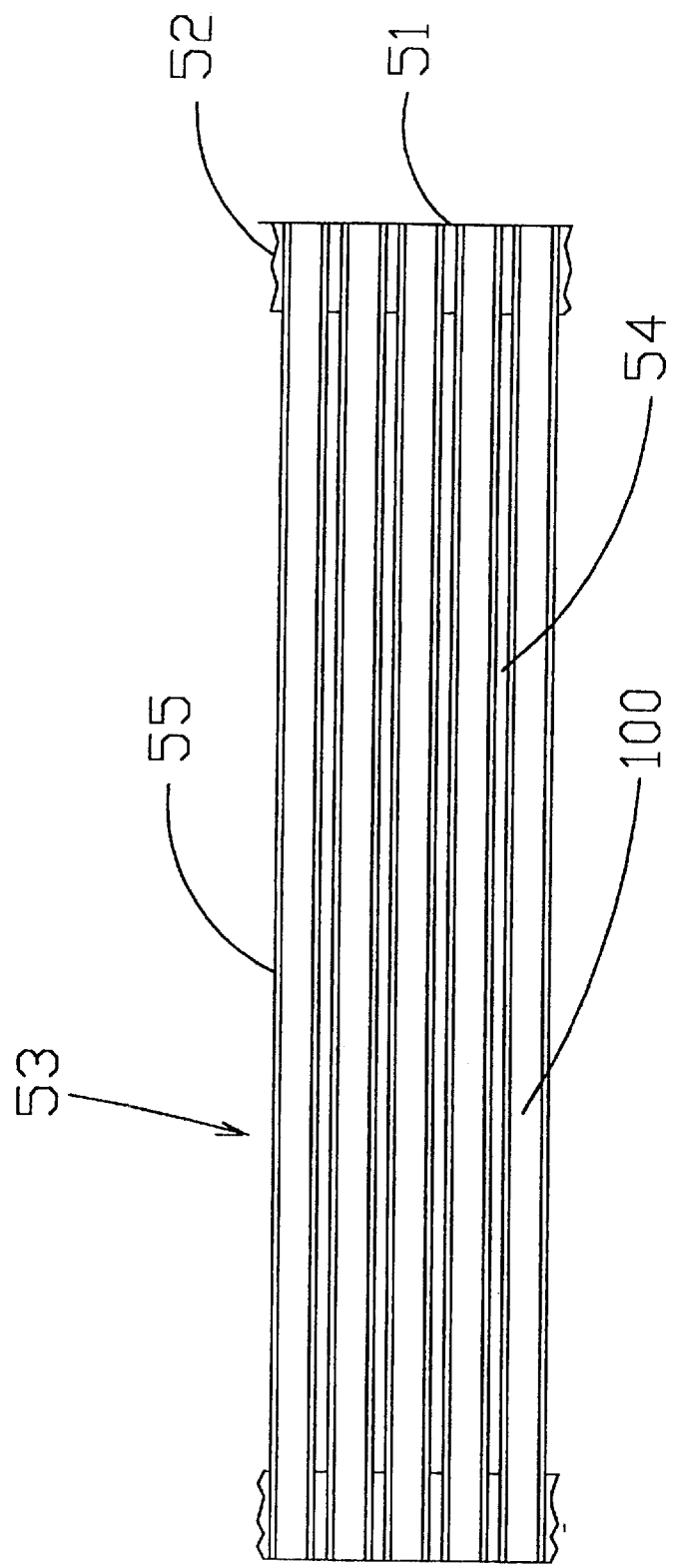
FIG. 5 is a section view of a cross flow trap module that is constructed from pre-manufactured sections of porous ceramic tubing.
Figure 6:
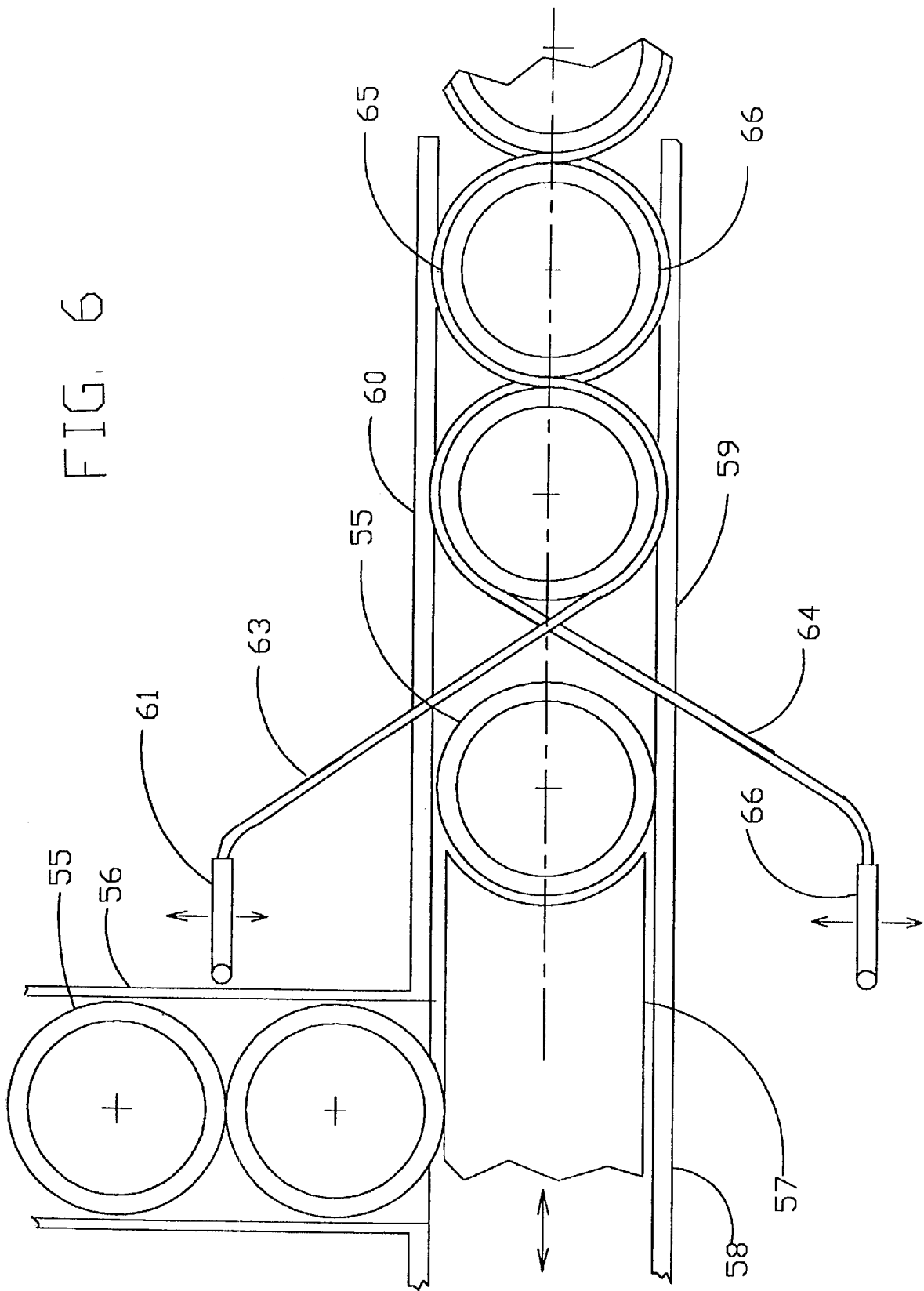
FIG. 6 is a section view of a machine that dispenses individual lengths of tubing and loom type wire-feeds that wrap a plastic mono-filament or wire about each tube near its end to form a mat.
Figure 7:
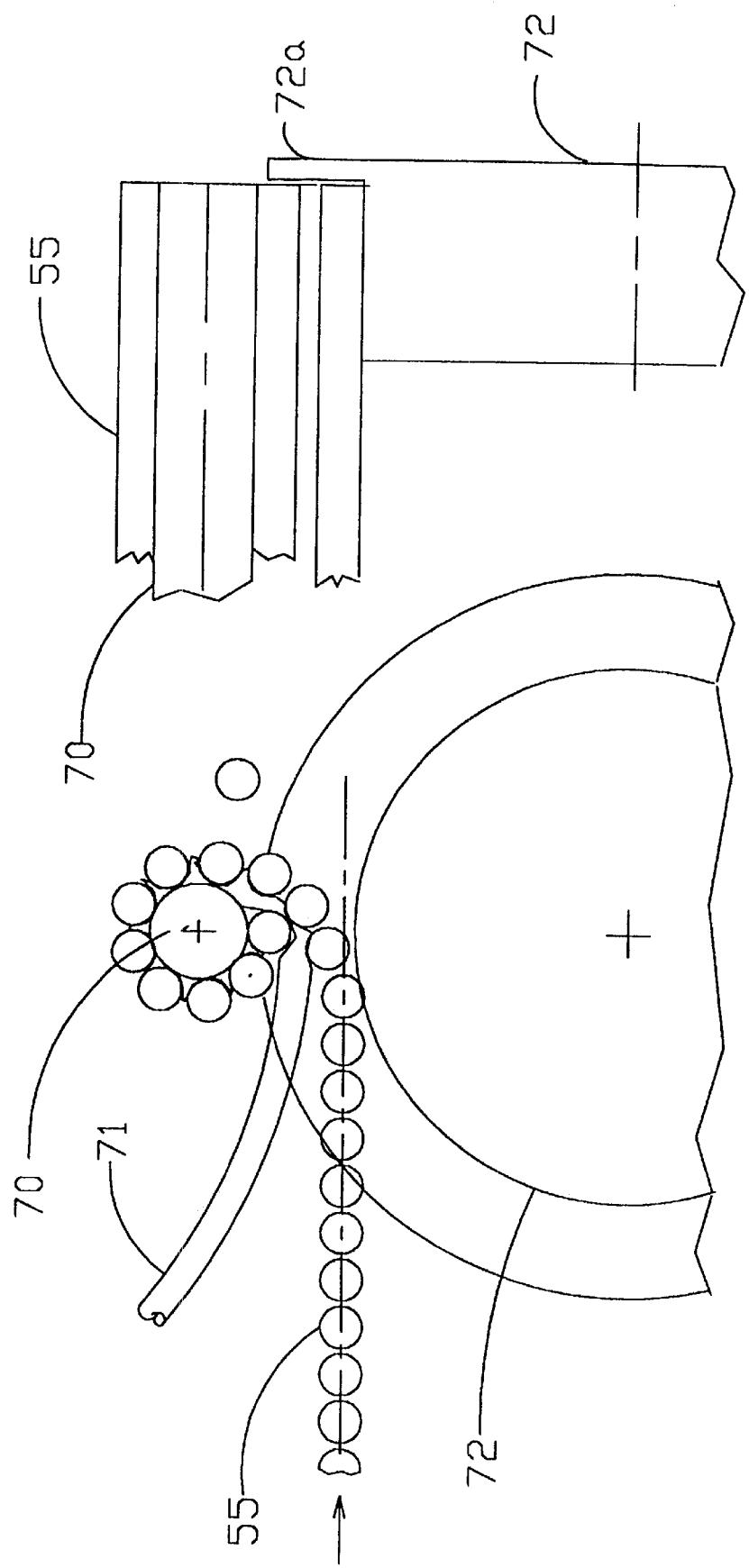
FIG. 7 is a section view of a machine that rolls the mat about a small mandrel while feeding a cord of plasticized ceramic between the entering mat and the developing trap module and in which the squeezed plasticized ceramic cord provides structural integrity and sealed end walls.

FIG. 5 is a section view of a cross flow trap module 53 that is constructed from pre-manufactured sections of porous ceramic tubes 55 that have been woven into mats followed by rolling the mats about a mandrel while using pliable plasticized ceramic material as a filler near the tube 55 ends. The device and method for manufacturing the cross flow trap module 53 is illustrated in FIGS. 6 and 7, and explained hereinafter. Binder wire is used to hold the tubes 55 in place and the diameter of the binder wire establishes the clearance between the tubes 50. The plasticized ceramic material, following firing, locks the assembly into a monolith having sealed end walls. FIG. 5 is one embodiment for manufacturing a cross flow trap module 53 that is preferred for traps that are quite large in diameter or in which only a moderate production rate is desired for any one configuration. The cross flow trap module 53 has a plurality of small diameter ceramic tubes 55, that have porous walls and are preferably made of cordierite ceramic. A plurality of the tubes 50 integrally attached at their outside diameters at each end wall or bulkhead 51, of similar material. The end walls 51 would be machined at their outer periphery 52, to permit them to be sealed in a suitable housing to totally separate any unfiltered exhaust gas from the filtered exhaust gas in clearance gaps 54 and exit ducting therefrom. The principles upon which this trap module 53 operates were discussed earlier in conjunction with FIG. 2. The general arrangements of the cross flow multi-tubular traps as used in various particulate trap systems are illustrated and described in my aforementioned co-pending application Ser. No. 09/516,480, filed Mar. 1, 2000, entitled "Apparatus and Method for Filtering Particulate In An Exhaust Trap."

FIG. 6 is a section view of a machine that dispenses individual lengths of cordierite tube 55 and loom type wire-feeds that wrap the plastic mono-filament or wires 63 and 64 about each tube 55 near its end to form a mat. This particular method of wrapping the mono-filament plastic or wire 63 and 64 about the tubes 55 holds the tubes 55 in a mat like form and also assures exact spacing between the outside peripheries of each tube 55 regardless of the radius through which the mat is rolled.

FIGS. 6 and 7 illustrate one method for assembling trap modules from tubes 55 that are manufactured by a conventional extrusion techniques. The tubes 55 can be fired prior to being subjected to the machine and processes illustrated in FIGS. 6 & 7 to provide good structural integrity. Alternatively, these steps might be performed while the tubes are still in the plasticized form and then fire the tubes 55 as part of the complete trap assembly. Referring to FIG. 6, the tubes 55, are fed downward in a hopper 56, by gravity and the action of a ram 57. Each time the ram 57 retracts, the tubes 55 are dropped into a trough 58, and then pushed to the right (in the drawing) as the ram 57 advances. The ram 57 and trough 58, formed by a lower member 59 and an upper member 60, constrain the principal length of the tubes 55 leaving about one inch at each end of the tubes 55 in the open. As each tube 55 is pushed to the right, plastic mono-filament or wires 63 and 64 are fed from each guide tube 61 and 66, which are moved up and down in concert with the ram 57 motion to wrap each wire 63 and 64, respectively, around the semi-periphery of each tube 55 at both ends. After the movement of the guide tubes 61 and 66 has occurred, the ram 57, pushes another tube 55 forward. As the ram 57 dwells, the guide tubes 61 and 66 move up and down again wrapping wires 63 and 64 around the next tube 55. The guide tubes 61 and 66 are similar to bobbins or more correctly part of a loom and, are located at both ends of the tubes 55. This action produces a tight mat of tubes 55, each of which have a pair of small 0.10 inch diameter wires 63 and 64 extending all around half of their periphery near the ends of each tube 55. The kinematics of this geometry permit the mat to be rolled about a small diameter mandrel, which is illustrated in FIG. 7 and explained hereinafter, while maintaining a minimum clearance of 0.10 inch between each of the tubes 55 outside diameters, regardless of the diameter of the roll. At a designated point along the mat, a small amount of quick drying cement or adhesive is placed on the tubes 55 at points 65 and 66. This fixes the tube 55 to the wires 63 and 64 without affecting the kinematics of the system and permits the mat to be cut into lengths at any desired point without loss of structural integrity.

FIG. 7 illustrates a device and method for rolling a mat of tube 55 lengths about a small mandrel 70. As this rolling process proceeds, a small rope 71 of unfired pliable plasticized cordierite, is fed in at the location of the wires 63 and 64 near each end of the tubes 55. The small rope 71 is of a material similar to that used for manufacturing tubes 55, preferably cordierite. This putty-like material is squeezed between the tubes 55 by the force exerted against the mat and the mandrel 70 by a spring-loaded roller 72. Flange 72a on the roller 72 prevents the putty-like material from being squeezed out at the ends of the tubes 55. After the entire mat has been rolled and sealed in this manner, a few extra turns of the mandrel 70 while still feeding the rope 71 of pliable plasticized cordierite will build up the end walls a small amount to provide an outer periphery for mounting and sealing the trap module in the particulate trap system structure. Following the rolling process, the trap module would be placed in a furnace and fired. This step would be followed by finish grinding of the periphery of the walls and possibly the trap faces. An alternate to the rolling process, not shown, would involve stacking shorter lengths of mat with unfired plasticized cordierite placed between the mat lengths at each end to build up the same type of squeezed-in-place end walls. These trap assemblies would be subsequently fired and machined. This modified process would permit the trap module to be of rectangular cross section, if desired.

FIGS. 8, 9, 10, 11a, and 11b illustrates alternative methods for manufacturing and articles of manufacture of the multi-tubular cross flow trap modules.

Figure 8:
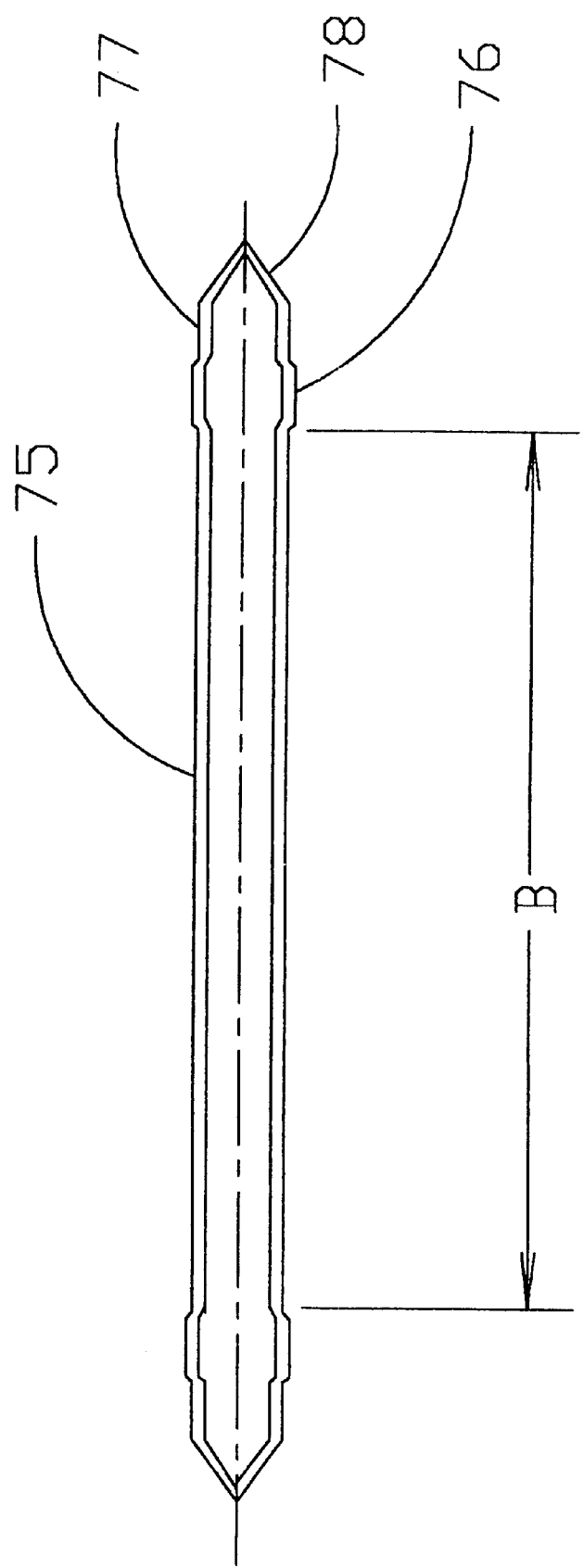
FIG. 8 is a section view of a tube that is made with an enlarged diameter near each end to establish the clearance between the parallel porous tubes used in an alternative method for assembling the trap module.

FIG. 8 is not drawn to scale but illustrates a cordierite tube 75 that has a modified design to facilitate assembly of the trap module. The outside diameter of tube 75, has an enlargement 76 by about 0.10 inch over a length of about 0.25 inches near each end. This enlargement 76 is to provide the desired clearance of about 0.010 of an inch between the main length, which is labeled "B", of the tubes 75. The short lengths 77 of the tube 75 are at each end of the tube 75 are the same diameter as the main length, which is labeled "B", of the tube 75 and are about 0.250 inches long. The ends of the tube 75 are pinched-off when they are cut to length resulting in pinched ends 78. The tubes would preferably be made by an extrusion process that will be discussed hereinafter.

Figure 9:
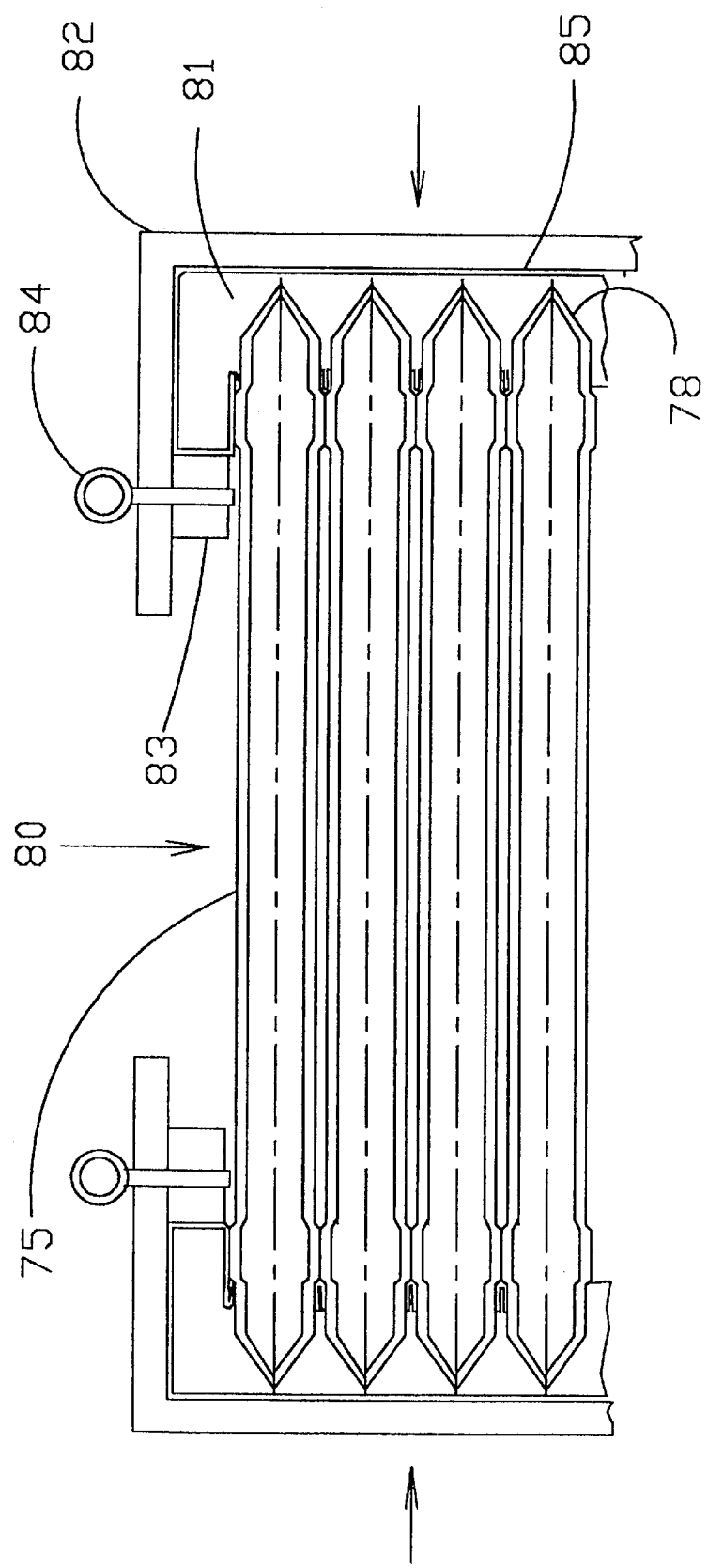
FIG. 9 is a section view of a method of forming a trap module from pre-manufactured lengths of porous tubing shown in FIG. 8 that have short lengths of slightly enlarged diameters near their closed ends.

FIG. 9 is a section view of a device and method for forming a trap module from pre-manufactured lengths of extruded and fired porous tubing 75 that have short lengths of slightly enlarged diameters near their closed ends to provide clearance to permit the filtered exhaust gas to escape. The end walls are formed by cylindrical disks of plasticized ceramic that are pressed over the pinched ends 78 of the bundles of tubes 75 and then fired to form the monolithic. Machining of the end walls is used to remove the tube 75 end closures. The tubes 75 are snugly bundled in the correct number and placed in a fixture 80. When bundled, the tubes 75 are separated along their main length by 0.010 inch by virtue of the short enlarged sections near each end. The bundles can be temporarily secured together by suitable straps or other means for strapping. Pliable plasticized cordierite discs 81, would then be placed in the inwardly movable end caps 82, of the fixture 80. Segmented rings 83 would be inserted and held in place by pins 84 to constrain the pliant plasticized ceramic in the outer regions of the plasticized cordierite discs 81. The end caps 82 are then pressed against the plasticized cordierite discs 81 simultaneously over the ends of the tubes 75, embedding them firmly in the plasticized cordierite discs 81. Prior to this operation, the plasticized cordierite discs 81 are preferably encased in a thin plastic cover 85. This plastic cover 85 would permit the end caps 82, to be retracted without sticking. Alternatively, the plastic cover 85 is pierced by the pinched ends 78 of the tubes 75 and then the plastic cover 85 prevents the plasticized cordierite from escaping until significant pressure is built up in the plasticized cordierite discs 81 and around the tubes 75 to eliminate any voids. The pinched ends 78 of the tube 75 prevents plasticized codierite from being pressed into the tubes 75 internal diameters.

Following these steps, the trap module assembly would be fired. This process bums out the plastic and sinters the cordierite or other suitable material into a porous monolithic structure. Following the firing process, the trap module is machined to remove the pinched ends 78 of the tubes 75 to open the passages. The periphery of the end wall plasticized cordierite discs 81 is machined to provide a retainer and seal surface for installation in the trap system structure.

Figure 10:
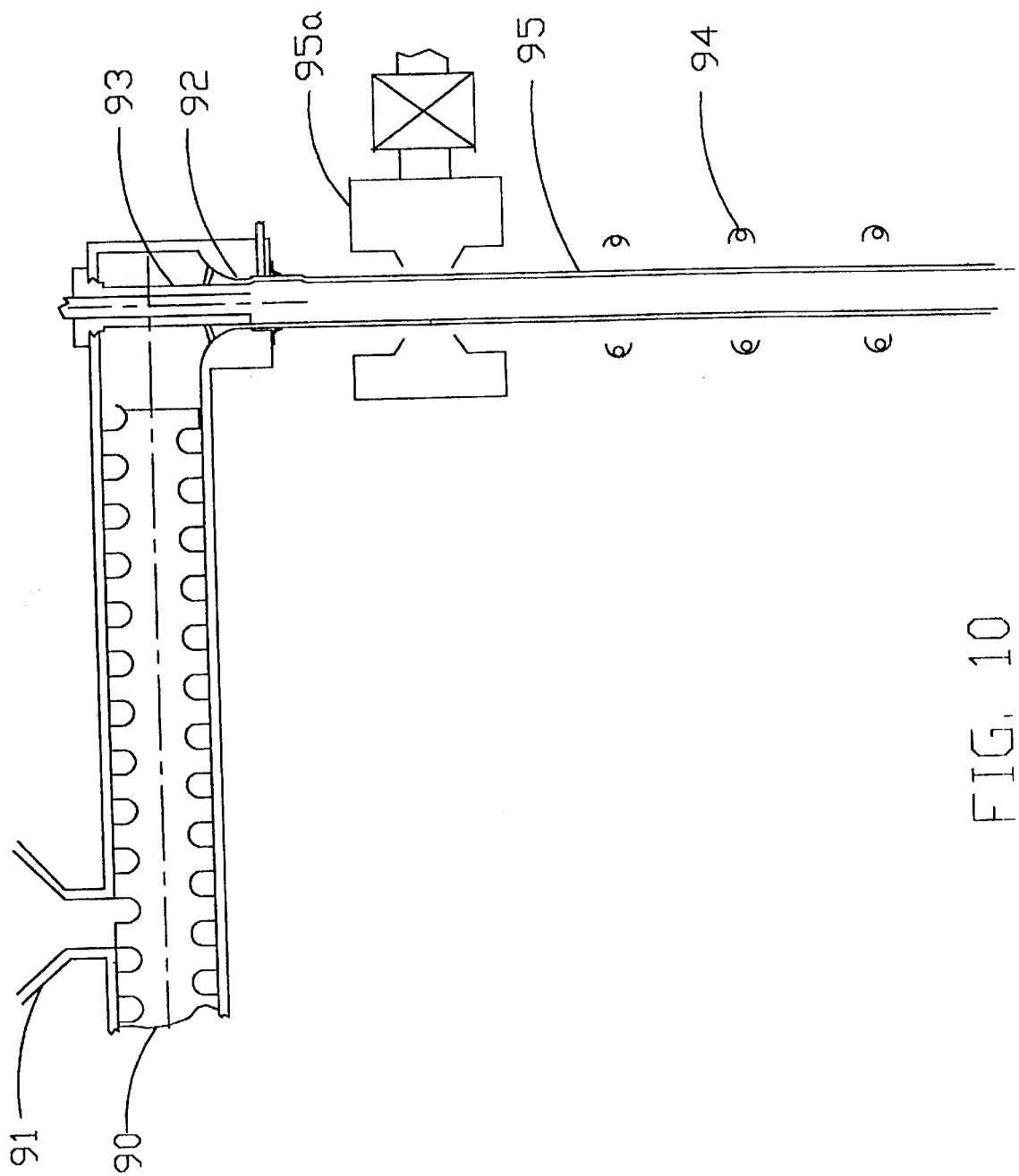
FIG. 10 is a section view of an extrusion machine used to manufacture the tubes shown in FIG. 8 illustrating an air knife for pinching off and cutting the tubes to lengths and means for sensing used to trigger the air knife and a die means to enlarge the tubes at controlled locations near their ends.

FIG. 10 is a section view of a conventional extrusion machine used to manufacture continuous plasticized cordierite tubes 95 illustrating an air knife or traveling mechanical device 95*a* used for pinching off and cutting the tubes 95 to lengths and method for sensing or controlling, used to trigger the air knife 95*a* and a die means to enlarge the tubes in controlled locations near their ends. The conventional extrusion machine is used to manufacture the tubes 95, preferably of plasticized cordierite, that are subsequently fired. The device consists of a screw 90, that feeds and heats the plasticized ceramic material fed into hopper 91. The material becomes pliable when heated and under pressure created by the screw 90. The material will flow between die orifice 92 and mandrel 93 to emerge as tubes 95. The die orifice 92 and mandrel 93 create the short enlarged sections of the tube 95 and is discussed in connection with FIGS. 11*a* and 11*b* hereinafter. The methods for sensing or controlling these functions include sensors 94, such as electric eyes or other proximity means, determine the position of the extruding tube 95. The air knife 95*a* directs a sharp 360 degree inflow of high pressure air to push in the walls of the tube 95 and ultimately pinch it off to cut the tube 95 to the correct length and close the end of the tube 95. It may be necessary to pierce a small hole in the end of the extruded tube prior to firing to prevent pressure from building up inside the tube during firing. The sensors 94 also control the die changes that enlarge the tubes 95 near each end. The reason for enlarged diameters near each end was discussed earlier.

FIGS. 11*a* and 11*b* illustrate two methods for forming the tubes illustrated in FIG. 9 and more specifically for forming the short, slightly enlarged sections of tubes 75. In FIG. 11*a*, a die orifice 96 and mandrel 97 provide the external and internal diameter of the principal length of the tubes 75. Just below the mandrel 97, the die orifice 96 of the die is enlarged by about 0.010 inch diameter as shown at 96*a*. This enlarged part of the die registers with a source of high vacuum controlled by valve 98, for brief periods on demand. Lip seal 99, prevents air entering the enlarged part of the die to permit a high vacuum to be obtained around the outer surface of the tube 75. When vacuum is not applied, the tube 75 is extruded in the normal manner to the basic die dimensions and it passes out under the lip seal 99. However, when the sensors 94 so direct, the valve 98 opens and a high vacuum is made to exist in the enlarged part of the die causing the pressure within the tube 75 to expand the tube 75 out until stopped by the enlarged part of the die 96*a* and the diameter of the tube 75 will become enlarged by 0.010 of an inch. When the sensors 94 direct the tube 75 to return to the basic dimensions, valve 98 will close and vent the enlarged part of the die to normal atmosphere and the tube 75 will again emerge with basic dimensions. It should be noted that air is permitted to freely enter the center of the mandrel 97 at 97*a* to prevent a vacuum from forming within the tube 75, the other end of which is intentionally pinched closed by a cut-off pinching process.

FIG. 11*b* shows an alternative method for expanding mandrel 101 to enlarge the tube 75. The tube 75 is formed to the external and internal dimensions desired for the principal length of the tube 75 by a die orifice 100 and the mandrel 101. When the sensors 94 dictate that enlarged sections (0.010 inch larger) are required, a valve (not shown) admits air through duct 102 which moves piston 103 upward, pulling a rod 104 upward and this action axially compresses elastomer mandrel section 105. Axial compression of elastomer mandrel section 105, causes its diameter to expand the desired amount and this results in the internal diameter of the tube 75 being enlarged along with the desired change in the outside diameter, as indicated by 105*a*. When the sensors 94 dictate that the extruding tube 75 should return to be its basic dimensions, the pressure is removed from the piston 103, permitting the elastomer mandrel section 105, of the mandrel 101 to return to its earlier smaller diameter. As in the concept illustrated in and described for FIG. 11*a*, air is permitted to enter the die at an entrance 106 and from there enter the tube 75 through passages 106*a*, to prevent a vacuum from forming as the closed tube 75 is extruded.

Industrial Application

The present invention is shown in arrangements that will provide production quantities of the monolithic cross flow particulate trap modules that have a plurality of parallel spaced-apart tubular passages that have porous walls and in which the outer periphery of the tubes are sealed in end walls near each end. Filtration of exhaust gas occurs as it passes through the porous walls and then pass through the clearance gaps around the tubes and then exits into the atmosphere. The porous walls prevent particulate from passing into the atmosphere; hence, only filtered exhaust gas is allowed to escape to the atmosphere. The filtering will result in an accumulation of soot and ash. The trap modules can also be arranged to periodically pass exhaust gas completely through the tubes at high velocity to remove accumulated soot and ash by erosion. This process is described in depth in my co-pending application Ser. No. 09/516,480, filed Mar. 1, 2000, entitled "Apparatus and Method for Filtering Particulate In An Exhaust Trap," which has been incorporated by reference.

In one version of the method and apparatus for manufacture of the trap modules, a specially designed extrusion die permits manufacture of the trap parallel spaced-apart tubes and integral end walls in one extrusion process to substantially produce, following sintering, a completed trap module. These arrangements permit high production rates at minimal unit cost.

An alternative method and apparatus assembles the tubes into trap modules in two or more manufacturing steps and permits manufacture of trap modules in sizes that may be too large for extrusion. It also permits manufacture of trap modules of different sizes and shapes with minimal change and expense for tooling.

What is claimed is:

1. An apparatus to manufacture a monolithic cross flow porous particulate trap having a plurality of porous tubes, comprising:

an extrusion machine having an overall cross section substantially the same as the monolithic cross flow porous particulate trap;

an axially movable honeycomb die member used with the extrusion machine;

honeycomb walls that move axially in concert with the axially movable honeycomb die member;

a plurality of projecting die members having enlarged heads for producing an internal cross section of the tubes;

wherein the axially movable honeycomb die member and the honeycomb walls are in a first position and substantially flush with the enlarged heads of the projecting die members such that a plasticized material flows through a clearance between the enlarged heads of the projecting die members and the axially movable honeycomb die member and/or honeycomb walls to form parallel and evenly spaced apart tubes, and wherein the space between the tubes define clearance gaps;

wherein the axially movable honeycomb die member and the honeycomb walls move from the first position to a second position such that the axially movable honeycomb member and the honeycomb walls do not encompass the enlarged heads of the projecting die members thereby forming a thick walled honeycomb end wall continuous with the spaced apart tubes and in which the internal dimensions of the honeycomb end wall passages are the same as the internal dimensions of the spaced apart tubes;

means for laterally guiding the extruded plasticized material to maintain substantially equal clearance in all directions between the tubes; and wherein the axially movable honeycomb die member and the honeycomb walls are moved back and forth from the second and the first positions depending on the desired length of tubes and the end walls.

2. The apparatus recited according to claim 1, wherein a rate of movement between the first and the second positions, and between the second and the first positions are controlled as a function of a rate of extrusion of the plasticized material such that a smooth transition occurs between the extrusion of parallel spaced-apart tubes having clearance gaps obtained at the first position and the extrusion of end walls obtained at the second position.

3. The apparatus recited according to claim 1, wherein the apparatus further includes means for cooling the extruded plasticized material, and means for cutting the cooled extruded tubes transversely into individual trap modules at substantially the longitudinal center of the end walls.

4. The apparatus recited according to claim 3, wherein the apparatus is controlled to provide additional end walls between those that are transversely cut to provide additional lateral support for the tubes.

5. The apparatus recited according to claim 1, wherein the enlarged heads of the projecting die members are substantially square in cross section.

* * * * *